United States Patent [19]

Buckley

[11] Patent Number: 4,499,894
[45] Date of Patent: Feb. 19, 1985

[54] PASSIVE SOLAR WATER HEATER SUPPORT BOX

[75] Inventor: Bruce S. Buckley, 7067 Via Blanca, San Jose, Calif. 95139

[73] Assignee: B. Shawn Buckley, San Jose, Calif.

[21] Appl. No.: 406,504

[22] Filed: Aug. 9, 1982

[51] Int. Cl.³ .................................................. F24J 3/00
[52] U.S. Cl. .................................. 126/450; 126/424; 126/436
[58] Field of Search ............... 126/436, 450, 424, 425; 220/71; 264/247, 269

[56] References Cited

U.S. PATENT DOCUMENTS

| | | | |
|---|---|---|---|
| 893,883 | 7/1908 | Stoelting | 220/71 |
| 2,902,028 | 9/1959 | Manly | 126/424 |
| 3,799,383 | 3/1974 | Gerhard | 220/71 |
| 3,987,784 | 10/1976 | Godrick | 126/450 |
| 3,989,031 | 11/1976 | Thomason et al. | 126/450 |
| 4,067,314 | 1/1978 | Bollefer | 126/435 |
| 4,223,214 | 9/1980 | Dorian et al. | 126/425 |
| 4,271,823 | 6/1981 | Erb | 126/441 |

Primary Examiner—James C. Yeung
Assistant Examiner—Noah Kamen
Attorney, Agent, or Firm—Burns, Doane, Swecker & Mathis

[57] ABSTRACT

A light weight support box is formed as a rigid beam from a single thin sheet of inexpensive plastic. The single sheet forms the bottom and side walls of the box and serves as the tensile member of said beam. The interior of the box is insulated to protect the sheet from thermal degradation of its tensile strength. The one-piece sheet, forming the walls and bottom, is secured at the open edge of said box to a reinforcing bar members to which beam compressive forces are transferred by the plastic sheet. The box is particularly suitable for roof top mounting of a passive solar water heating system, including either a solar collector, or absorber, panel or a hot water storage tank, or both in a back-to-back assembly.

17 Claims, 4 Drawing Figures

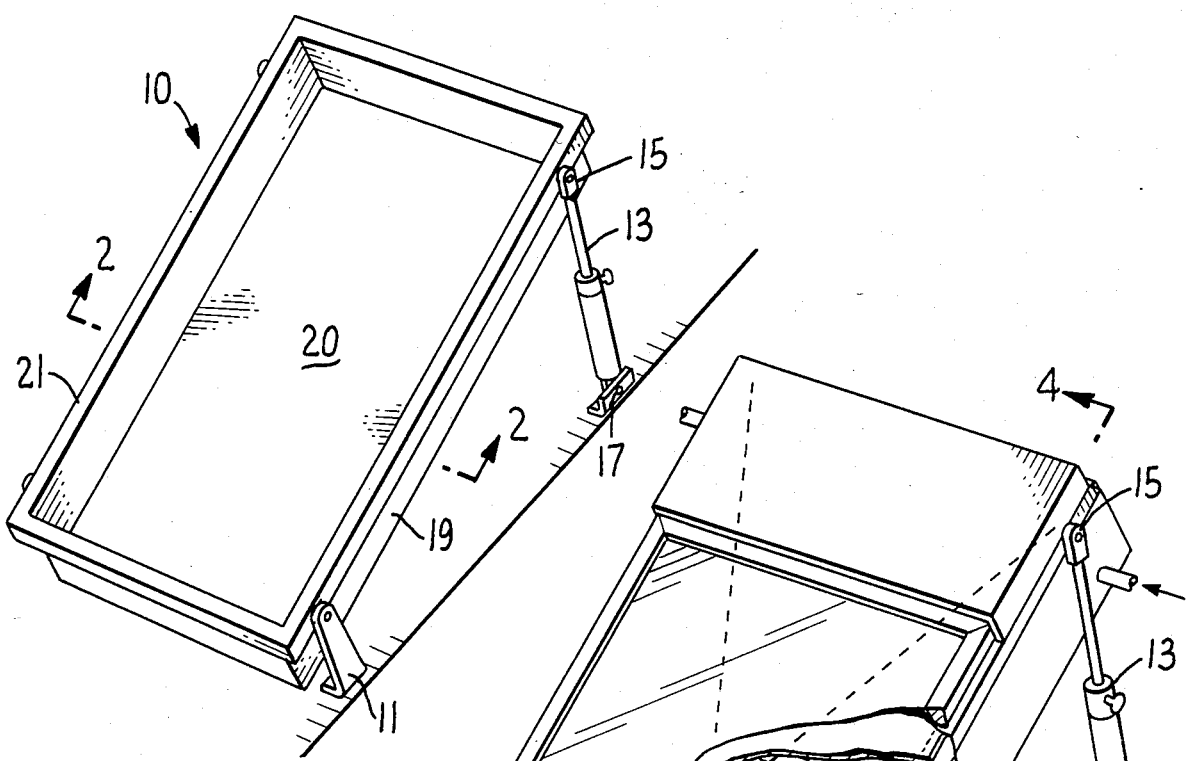
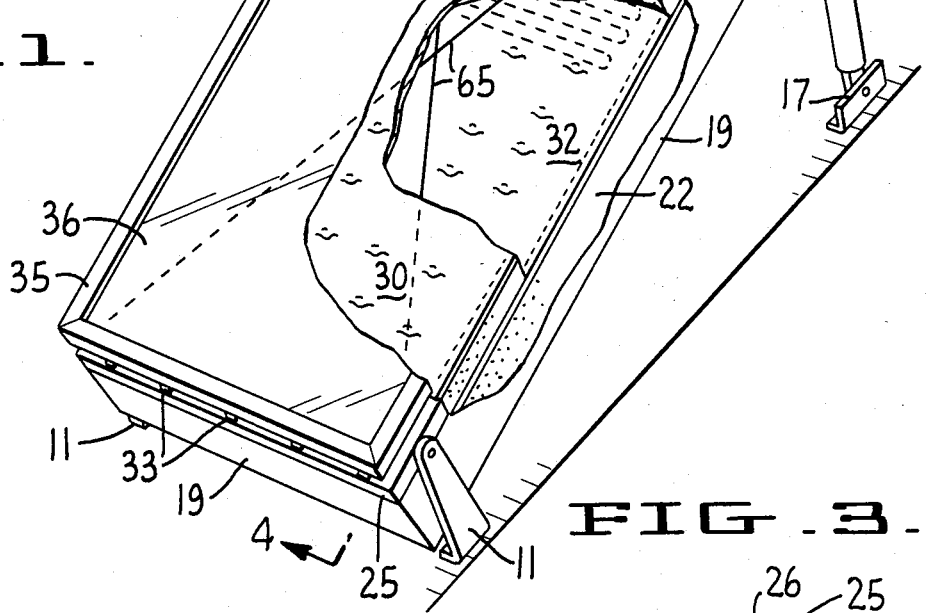
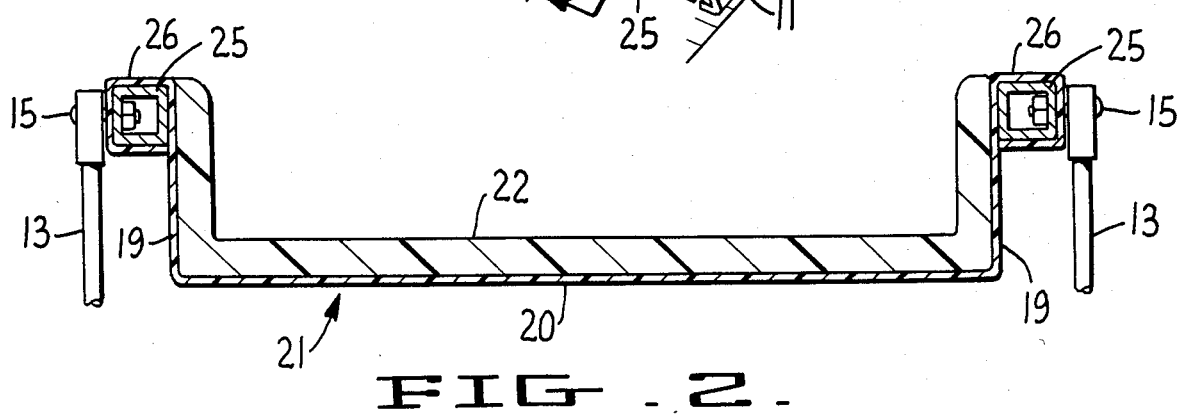

PASSIVE SOLAR WATER HEATER SUPPORT BOX

FIELD OF INVENTION

The present invention relates to support boxes for a passive solar water heating system. More particularly it relates to light weight thermoplastic or thermoset support boxes with sufficient structural stability to support a solar absorption panel, or hot liquid storage tank, or both, operating at a temperature near the thermoelastic tensile limit of such material.

It is a particular object of the present invention to provide a rigid support box formed of a relatively thin sheet of a thermosetting or a thermoplastic material, with or without reinforcing fibers, such as glass filaments, to position a passive solar water system for maximum solar absorption. In accordance with the invention, a single sheet forms continuous side walls and a bottom to support a liquid filled solar energy absorption panel, or a hot water storage tank, or both, by securing the sheet to a peripheral bar member around the open to form respectively the tension and a compression elements of a composite "beam". The inner surface of said sheet is insulated from the solar heated fluid to maintain its tensile strength by an insulation layer either cast and bonded to the thermoplastic sheet or precast to the correct shape to functionally engage the surface. In this way, the distributed load of a liquid filled panel or tank is carried by the tensile strength of the thin plastic sheet and compressive loads imposed on the sheet by static forces of the fluid weight, or dynamic environmental forces, are transferred to the peripheral bar member which resists the compressive forces applied through the ends of the sheet secured thereto. Accordingly a solar panel may be supported at any suitable angle for maximum solar energy absorption by a few points, or small areas, acting through the bar member. Such construction is particularly important for roof top or other elevated locations which are not readily accessible, to provide an inexpensive and lightweight support for a domestic water heating system.

BACKGROUND OF THE INVENTION

Thermoplastic or thermosetting plastic materials, including reinforcing fibers, such as glass filaments, have been proposed heretofore as suitable construction materials for solar energy absorbing panels and for hot liquid storage tanks. While such plastic materials are considerably cheaper than copper or stainless steel for such panels or tanks, their tensile strength is generally low at near boiling-water temperatures which they must sustain in service. Further, most of such materials become more soluble in the heat absorbing liquid, generally water or a typically an anti-freeze liquid, such as alcohol or ethylene glycol, at elevated operating temperatures. While thermoset materials, such as epoxys or polyesters, and particularly those bonded with glass fibers, are quite satisfactory, such material is expensive when cast or formed in a panel as large as 4 ft. by 8 ft. that is thick enough to be supported at a few points to tilt or elevate it. Such limited support is necessary to avoid serious overloads on a building roof if a conventional steel frame or a wooden support pad is required to support the entire solar panel. The problem is even more severe in a passive solar system. In passive systems the liquid storage tank is either positioned above the solar panel, so that both tank and panel must be separately supported, or as taught in my U.S. Pat. Nos. 4,137,964 and 4,050,508, the storage tank and panel are mounted back-to-back in a single support box. In either case, the total load of both solar panel and storage tank further stress any mounting box and support means.

In addition to the problems noted above with regard to the solar panel or storage tank, a metal support box adds to both the weight and the overall cost of the installation. Where the panel and tank are made of thermoplastic or rubber, the containers themselves have little or no rigidity to resist buckling or compression, and generally thermoplastic materials have reduced tensile strength at elevated temperatures. Accordingly, a light weight, inexpensive container or support box for a solar panel or a storage tank, or both (as in the case of a back-to-back assembly) is highly desirable both to reduce the overall initial cost of solar water heating and to limit cost for maintenance over an extended life of from ten to twenty years, as projected for an adequate passive solar water heating system.

SUMMARY OF THE INVENTION

In accordance with the present invention, a light weight, inexpensive, long life, support box is made possible by forming the wall and bottom from a continuous sheet of plastic material, such as ABS (Acrylonitrile-butadiene-styrene) which may have low tensile strength at elevated temperatures, e.g. solar heated water. The side wall portion of the sheet is bonded or secured around the upper periphera or top edge of the open box to one or more bars which form both the upper edges and the compression and buckling force resistance member of the "beam" formed by such construction of said box when it is supported either throughout the length of said bar members or at a few limited areas, or points. The inner surface of said walls and bottom have formed thereon, or conforming thereto, an overlying insulation layer substantially coextensive with the continuous sheet. Said insulation uniformly distributes the load imposed by the weight of the solar panel or storage tank, particularly the liquid load, to the sheet (resisting tensile forces) and the reinforcing bars (resisting compressive forces) at the open top of the box. At the same time, the insulation layer assures that the tensile strength of the sheet is not decreased by the heated fluid in the panel or tank.

Such structure in effect forms a load supporting "beam" as viewed in cross-section, when it is supported at its ends through the reinforcing bar members. The sheet material is the tensile member at the bottom of the beam and the reinforcing bar members are the compression member when it is substantially uniformly loaded and the "beam" is supported at its ends. The tensile member is maintained at its maximum strength while carrying the heated load (the solar heated fluid) by the insulation layer conforming to the tensile member. By such construction the sheet member may be formed with a thickness of less than 0.1 inch and preferably from 0.030 inch to 0.060 inch for a span of 24 inches to 120 inches for the width or length of the bottom and with side walls from 1 to 10 inches deep. Accordingly the length to thickness ratio may be from 10 to 300 for the sidewalls and from about 240 to 4000 for the box bottom. Where the sheet thickness does not exceed about 0.03 to 0.06 inches, the foam or insulation layer is from ½ to 1 inch thick so that ratio of insulation to sheet thickness is from about 5 to 35.

Further objects and advantages of the present invention will become apparent from the following detailed description of the preferred embodiments, taken in conjuction with the accompanying drawings which form an integral part of the present specification.

DESCRIPTION OF THE DRAWINGS

FIG. 1 is a perspective view of a simplified form of a support box constructed in accordance with the present invention and particularly illustrates a point mounting arrangement for installation of a solar panel, or liquid storage tank, or both, on a roof or other limited weight-to-loading-area installation.

FIG. 2 is a cross sectional view, taken in the direction of arrows 2—2 in FIG. 1, particularly illustrating the composite "beam" construction of such an open top support box.

FIG. 3 is a perspective view partially in cross-section of a combined solar panel and hot liquid storage tank, including a heat exchanger, of a preferred embodiment of the solar water heating support box constructed in accordance with the present invention.

DESCRIPTION OF PREFERRED EMBODIMENTS

Figure 4:
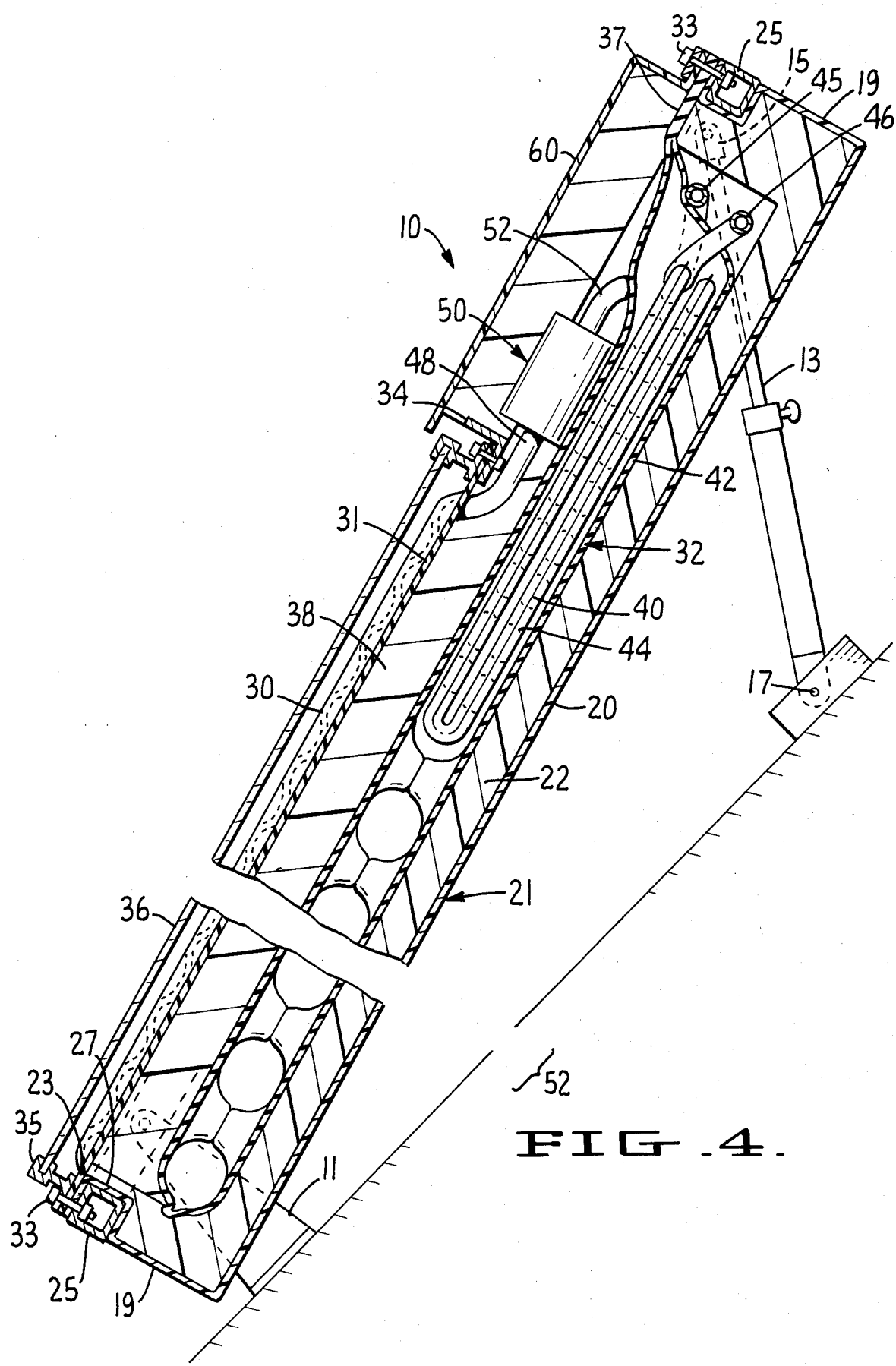
FIG. 4 is a detailed cross-sectional elevation view taken in the direction of arrows 4—4 in the arrangement of FIG. 3.

FIG. 1 illustrates, in a perspective view, a support box 10 for a solar energy absorber panel or a hot liquid storage tank, or both, constructed in accordance with the present invention. In a passive solar water heating system both the solar panel and the hot liquid storage tank are either mounted back-to-back, as in the present embodiment, or tank-over-panel, on a roof or other sun exposing location.

For maximum efficiency the solar panel 30 must be tilted so that its surface is generally perpendicular to the sun's rays when the greatest amount of solar energy is available at the geographic latitude of the installation. Such a tilted attitude seldom conforms to the angle or orientation of the roof surface or other mounting structure. For this reason support box 10 is most conveniently held in the correct position by a few points, or small surface areas, such as those provided by lower hinge supports 11 and the adjustable legs 13 acting through box pivots points 15 and roof pivots 17.

Dimensions of such a support box to position a suitable solar panel must be on the order of 2 to 6 feet wide and 6 to 10 feet long so that total area is a few tens of square feet, i.e. 10 to 60. Correspondingly, to serve as a solar water heater, the temperature of the heat exchange liquid in panel 30 and the storage tank 32 must approach that of boiling water, say 200° F. (94° C.). Additionally, where the panel and storage tank are formed of rubber or thermoplastic, rather than metal for reasons of cost, the panel or tank apply a distributed load over the entire area that will not rigidly support itself. Accordingly, a support box is essential; but further, it must be light weight and rigid under both static loads and dynamic wind loads and temperature conditions. As noted before sheet-metal boxes are both expensive and heavy. However, in general, thermoplastics do not have adequate tensile strength at efficient operating temperatures. Such materials are normally formed or "set" at approximately boiling-water temperatures and accordingly they yield at these temperatures.

Despite the foregoing limitations, in accordance with this invention, relatively inexpensive plastic materials, such as ABS or glass-fiber epoxy panels can be formed with adequate tensile strength in thin sheets; that is, less than about 1/10 inch thick, and preferably no greater than about 0.03 or 0.06 inches (30 to 60 mils). Such sheets may either be molded in a single male or female open mold or by pressure between two dies. In an open mold, the thermoset resin is spray coated on glass fibers on the forming die and preferably vacuum or pressure formed to the mold using the bag molding method. Using a thermoplastic material, a flat sheet is first heated and then pulled by a vacuum against the open mold where the thermoplastic hardens. In this way the walls 19 and bottom 20 are formed from a continuous sheet 21 in a generally U-shape, as shown in cross-section in FIG. 2. Since such sheet, if its yield temperature is not exceeded, has excellent tensile strength, bottom 20 may be considered to form the tensile member of a beam, uniformly loaded by the solar heated liquid between side walls 19 by the solar heated liquid. To prevent sheet 21 from being subjected to a temperature in excess of its yield point, insulation layer 22 conforms to the inner surface of box 10. This layer is preferably foamed polystyrene so that the weight thereof is as low as possible. Layer 22 may be separately formed and then inserted into box 10 so that it closely conforms to side walls 19 and bottom 20. Preferably insulation layer 22 is a foamed plastic and cast in place in box 10.

As particularly contemplated by the present invention, insulation layer 22 need not contain reinforcing material since it forms only an insulation layer for evenly distributing the load of liquid from a solar absorber panel or a storage tank, or both, as in the embodiment of FIGS. 3 and 4.

For the purpose of maintaining the light weight, but rigid, construction of box 10, sheet 21 is secured to reinforcing bars 25 formed at the top edge of box 10. Bar 25, in the embodiment of FIGS. 1 and 2 may be, as shown, molded or embedded in the outer edge of sheet 21 as by "wrapping" edges 26 of sheet 21 around square bar member 25. In the arrangement of FIGS. 3 and 4, box 10 includes a peripheral recess 27 so that overturned edges 23 of sheet 21 wrap around bar 25 and are secured at spaced apart points by screws 33 through frame 35 of cover plate 36 for solar panel 30. By either arrangement, all "beam" compressive forces induced by uniform loading of sheet 21 are transferred to bar 25. Thereby, both turning moments applied by spaced apart supports attached to the beam through reinforcing bar 25 and compressive forces applied by the load are balanced to form a relatively stiff beam with thin plastic sheet material. Bar 25 may of course be formed in segments corresponding to each top edge 23 of rectangular box 10. However, preferably bar 25 is made continuous by joining or securing the four edges together around the open top of box 10. Desirably, the corners are secured together after formation of sheet 21 so that stresses are not induced in the sheet by thermal expansion or contraction of the several metal or plastic bar members 25 forming the top of box 10.

INDUSTRIAL APPLICATION OF INVENTION

FIG. 4 illustrates in detail a passive solar water heating system in which both solar collector 30 and storage tank 32 are supported back-to-back in support box 10 constructed in accordance with the present invention. As there shown, units 30 and 32 are formed of flexible material such as EPDM (Ethylene and Propylene Diene Monomers) rubber which permits the liquid volume in the units to bulge in a controlled manner to their desired shape. My application, Ser. No. 258,519 filed Apr. 28, 1981, assigned to the assignee of the present invention, discloses such structure. The disclosure of said application is incorporated herein by this reference thereto.

Since both solar panel 30 and storage tank 32 are specifically constructed to be non-rigid structures, support box 10 forms a "bed" for storage tank 32 on insulation liner 22. As shown, an insulating member or blanket, 38, overlies tank 32 to insulate liquid in tank 32 when liquid temperature in solar collector 30 is lower than ambient, such as at night, or during inclement weather. Member 38 may be preformed, or cast in place with foamed plastic such as polystyrene.

In this embodiment beam reinforcing bar 25 is a rigid square bar fitted into channel 27 formed by overturned upper edge 23. Upper edge 23 of box 10 also provides a clamping surface for holding edge 31 of solar panel 30. The edge 31 of panel 30 is conveniently clamped against a cross member, such as structural angle member 34 also supported by bar 25. Clamping of the edges of solar panel 30 is by rectangular frame member 35 which supports cover glass 36 above the surface of solar panel 30. Frame 35 is secured to bar 25 by any suitable means such as sheet metal screws 33 or other mechanical fasteners. Bar 25 also secures the upper end of storage tank 32 after it has been sealed with heat exchanger 40 and the latter is enclosed in the upper end 42 of tank 32. Upper end 42 is desirably left unbonded during formation of tank 32 so that heat exchanger 40 can be installed as a unit.

As indicated, heat exchanger 40 comprises a serpentine arrangement, preferably copper or stainless steel piping (for good heat conduction). In FIG. 4 this is shown by as pipe coil 44. Conveniently, for maximum heat exchange capacity and light weight, coil 44 is formed by the "roll bond" method, similar to those now used in household refrigerators. The ends of coil 44 are connected to a hot water supply system, as by cold water inlet line 45 and heated water outlet line 46. As shown, the wall of storage tank 32 is sealed around the portions of coil 44 passing therethrough. After installation of heat exchanger 40, upper edge 37 is sealed by clamping the edges of sheets forming storage tank 32.

To form a closed circulation system, the inlets and outlets of solar collector panel 30 and tank 40 are arranged to interconnect complementarily. For passive operation, as in the present embodiment, a one way valve, indicated as 50 is in the flow path through outlet 48 for collector 30 and inlet 52 to storage tank 32. This valve permits one-way flow to serve as a "thermic diode". Its primary function is to prevent back-flow of hot water stored in storage tank 32 to collector 30 when the latter cools off at night or in inclement weather.

U.S. Pat. Nos. 4,137,964 and 4,050,508 disclose forms of such a valve. U.S. patent application Ser. No. 216,677, H. W. Sigworth, Jr., assigned to the assignee of this application, discloses an alternate form of such a valve.

One way valve 50, and the upper end of storage tank 32 are enclosed by a cover plate 60 secured to structural bar member 25.

To mount the assembly on a roof, for instance, pivot support 11 is connected to roof 52 and bar 25 of box 10. The top of box 10 is then tilted to a desired angle, as determined by geographic latitude, by adjustable arms 13, between roof support pivot 17 and pivot 15 connected to bar 25.

To prevent torsionally induced stresses in box 10, if one of the four supports is broken or lost, it may be desirable to include diagonal bracing members across a substantial portion of the box. For example a pair of diagonal bracing wires, such as 65, shown in FIG. 3, may extend between the non-adjacent corners of bars 25, as indicated or diagonally across a substantial portion of the longer lengths of bar 25 to support fifty percent or more of the bottom area of box 10. Alternatively, rectangular frame 35, together with dust cover or glass 36, may be secured to bar 25 to resist torsional forces if one or more supports for box 10 is broken.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, all such variations and changes, which fall within the spirit and scope of the present invention as defined in the following claims, are expressly intended to be embraced thereby.

What is claimed is:

1. A method of forming a solar water heating tank support box of a single sheet of plastic material which
   comprises securing each of the edges of said plastic sheet to an open rectangular reinforcing bar member to form therewith the integral upper edges of said box,
   extending the surface of said plastic sheet continuously and transversely from each of the inner edges from of said bar member to form side-wall surfaces and laterally between the other ends of said side wall surfaces to form a unitary side wall and bottom surface of an open top box, and
   insulating the interior surface of said plastic sheet forming said open top box to assure that the tensile strength of said plastic sheet is not exceeded by the weight of heated liquid in a tank supported by said unitary bottom and said side wall surfaces and that the compressive forces of said weight are thereby transferred to said reinforcing bar member whereby said box may be tilted to a desired angle at a plurality of support points around the periphery of said reinforcing bar member.

2. A method of forming a support box in accordance with claim 1 in which said plastic sheet is less than about 0.1 inch thick.

3. A method of forming a support box in accordance with claim 1 in which said sheet has a thickness of from about 0.03 inch to 0.1 inches.

4. A method of forming a support box in accordance with claim 3 in which said side walls have a depth to thickness ratio of from about 10 to 300 and said bottom has a length to thickness ratio of from about 240 to 4000.

5. A method of forming a support box in accordance with claim 1 in which said insulation conforms to the surface of said sheet and said insulation has a thickness of from 5 to 100 times greater than the thickness of said sheet.

6. A method of forming a support box in accordance with claim 1 in which said insulation is a separate member molded to conform with the inner surfaces of said open top box.

7. A method of forming a support box in accordance with claim 1 wherein said box is torsionally braced by extending diagonal tensile means between non-adjacent corners of said bar member forming the top of said box to resist torsional forces applied by the weight in said box to said bar member by a change in the distribution of load supported by each of said plurality of support points.

8. A support box for a solar water heating system storage tank or solar panel, or both, formed of a thermoplastic material having a low yield point at elevated temperatures;

said box including a generally open rectangular compression frame member surrounding the upper edge of said box, said thermoplastic material being in sheet form with its edges secured to the periphery of said compression frame member, said sheet being a single surface forming continuous side walls and a bottom for said box and the interior surface of said continuous side wall and bottom having thermal insulation extending over substantially the full surface of said thermoplastic sheet to prevent heated fluid in said tank or said solar panel from directly contacting said thermoplastic sheet to reduce the tensile strength thereof and means for supporting said box at a plurality of points spaced apart around the periphery of said frame member to permit one end of said box to be tilted relative to the other end to permit a solar panel to be properly disposed for solar energy absorption, said frame member thereby resisting compressive forces applied by weight in said box through said thermoplastic sheet.

9. A support box in accordance with claim 8 in which said sheet is less than about 0.1 inch thick.

10. A support box in accordance with claim 8 in which said sheet has a thickness of from about 0.1 inch to 0.03 inches.

11. A support box in accordance with claim 10 in which said side walls have a depth to thickness ratio of from about 10 to 300 and said bottom has a length to thickness ratio of from about 240 to 4000.

12. A support box in accordance with claim 8 in which said insulation conforms to the surface of said sheet and said insulation has a thickness of from 5 to 100 times greater than the thickness of said sheet.

13. A support box in accordance with claim 8 in which said insulation is a separate member molded to conform with the inner surfaces of said open top box.

14. A support box in accordance with claim 8 wherein said rectangular box includes diagonal reinforcing means secured between non-adjacent corners of said frame member to resist torsional forces applied to said box by changes in load distribution at said spaced apart points.

15. A method of forming a passive solar water heating system support box, said box including means for supporting both a solar panel and a hot liquid storage tank therein, and means for supporting said box, including said solar panel and said storage tank to permit said solar panel to be positioned for maximum solar energy absorption which comprises forming an open top box including a bottom portion and side wall portions of a continuous film of formable plastic having a relatively high tensile strength relative to its resistance to compression and/or buckling stresses, securing the top edge of said side wall portions of said sheet to a rectangular bar member forming the open perimeter of said box, said bar member being disposed substantially perpendicular to said side wall portions to form a compression and/or buckling stress resistant member for loads applied normally to said continuous film through said bottom by the combined weight of said solar panel and said storage tank, and means for supporting said box at a plurality of spaced apart points through said rectangular bar member to permit said box, including said solar panel and said storage tank, to be tilted so that said solar panel may be exposed for maximum solar energy absorption.

16. A method in accordance with claim 15 wherein said top edge of said sheet is molded to said bar member.

17. A method in accordance with claim 15 in which said bar member is formed by a plurality of segments and said segments are secured together after said sheet is molded to said segments.

* * * * *